United States Patent [19]

Symons et al.

[11] 4,072,540
[45] Feb. 7, 1978

[54] RECHARGEABLE ELECTRICAL ENERGY STORAGE DEVICE

[75] Inventors: Philip C. Symons, Birmingham; Carmelo J. Amato, Livonia, both of Mich.

[73] Assignee: Energy Development Associates, Madison Heights, Mich.

[21] Appl. No.: 441,733

[22] Filed: Feb. 14, 1974

Related U.S. Application Data

[63] Continuation of Ser. No. 199,966, Nov. 18, 1971, abandoned.

[51] Int. Cl.² ................. H01M 8/06; H01M 8/18
[52] U.S. Cl. .................................. 429/70; 429/53; 429/66; 429/67; 429/72; 429/101
[58] Field of Search ................................ 136/86 A

[56] References Cited
U.S. PATENT DOCUMENTS 3,814,630  6/1974  Bjorkman ................ 136/86 A
3,823,036  7/1974  Bjorkman ................ 136/86 A

*Primary Examiner*—John H. Mack
*Assistant Examiner*—H. A. Feeley
*Attorney, Agent, or Firm*—Ostrolenk, Faber, Gerb & Soffen

[57] ABSTRACT

An electrical energy storage device comprising at least one cell containing a normally positive electrode at which a halogen is reduced and a normally negative electrode at which a metal is oxidized during an electrical discharge of the storage device. The halogen and oxidizable metal components consumed during the electrical discharge of the device are regenerated during an electrical recharging of the storage device and the halogen component is recovered and converted to a halogen hydrate for storage in the system.

2 Claims, 5 Drawing Figures

RECHARGEABLE ELECTRICAL ENERGY STORAGE DEVICE

This is a Continuation of application Ser. No. 199,966, filed Nov. 18, 1971, now abandoned.

BACKGROUND OF THE INVENTION

The present invention relates to electric storage batteries which have been categorized as being of the so-called high energy density (H.E.D.) type which are capable of supplying upwards of 50 watt hours of electric power per pound of weight. The high energy capacity and compactness of such H.E.D. batteries renders them particularly satisfactory for use in a variety of stationary and mobile power plant systems either as the principal source of electrical energy or as a backup supply. A continuing deterrent to a more widespread adoption of secondary electrical storage devices of the types heretofore known have been the difficulty in effecting a recharging of such storage devices as well as the potential toxicity and danger associated with the chemical constituents employed in the electrochemical generation of current. Added factors also detracting from a more widespread use of such prior art secondary storage devices has been the relatively high cost of the materials utilized in such electric energy storage systems and the relatively slow rate at which such storage systems can be recharged to full capacity.

The secondary electrical energy storage system comprising the present invention overcomes the problems and deficiencies associated with prior art type devices by employing a metal/halogen hydrate system that facilitates a regeneration and storage of the chemical components making the system particularly attractive for use in mobile powered equipment.

SUMMARY OF THE INVENTION

The benefits and advantages of the present invention are achieved by a rechargeable electrical energy storage system which preferably, but not necessarily, is employed for supplying electrical power to electrically propelled vehicles including automobiles, recreational vehicles and off-the-road farm implement and mobile construction equipment. The electrical energy storage system comprises at least one and usually a plurality of cells, each containing a normally positive electrode for reducing a halogen disposed in electrical contact therewith and normally negative electrode for oxidizing an oxidizable metal disposed in electrical contact therewith during an electrical discharge of said cells. A storage reservoir is embodied in the system and contains a quantity of halogen hydrate through which an aqueous electrolyte containing dissolved ions of the metal and halogen is circulated and is returned to the cell. During a normal discharge of the electrical storage system, the halogen hydrate progressively decomposes, replenishing the quantity of halogen reduced at the normally positive electrode; while the metal at the normally negative electrode is progressively oxidized and enters the solution as a soluble metal ion.

A replenishment of the oxidizable metal and halogen hydrate is achieved by an electrical recharging of the system during which a reverse potential is applied to the terminals of the cells, thereby effecting a reduction of the metal ions at the normally negative electrode and a redeposition thereon and a corresponding oxidation of the halide ion at the normally positive electrode to produce the corresponding elemental halogen. The regenerated halogen is extracted and is reprocessed in a hydrate former to produce the corresponding halogen hydrate which is separated and returned to the storage reservoir. Suitable heat transfer means are incorporated in the recharging system for maintaining the halogen and the water mixture at an appropriate temperature to facilitate the formation of the hydrate.

In accordance with one embodiment of the present invention, the entire system is incorporated on a vehicle and a recharging thereof is effected by connecting the system to an external source of electrical energy. In accordance with alternative satisfactory embodiments, the hydrate former and/or the heat transfer means are embodied in a recharging system which is disposed remote of the electrical storage system and is connectable thereto during the recharging cycle. In accordance with these latter embodiments, the recharging section can be successively utilized for recharging individual electrical energy storage systems, thereby prorating its cost over a plurality of such storage devices, while at the same time reducing the total weight of the storage system as embodied in the vehicle.

Still other advantages and benefits of the present invention will become apparent upon a reading of the description of the preferred embodiments taken in conjunction with the accompanying drawings.

DESCRIPTION OF THE PREFERRED EMBODIMENTS

Figure 1:
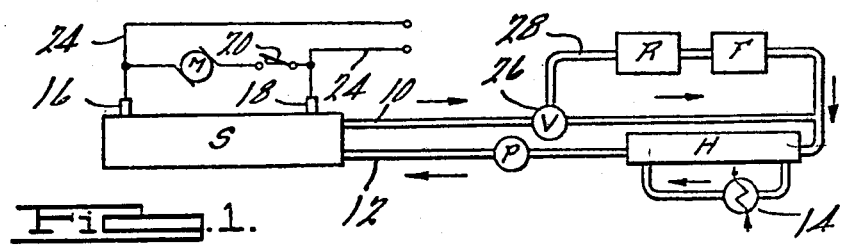
FIG. 1 is a diagrammatic flow sheet illustrating the components of an electrical storage system of the present invention.

An electrical energy storage system of the type to which the present invention is applicable utilizes a halogen hydrate as the source of a halogen for reduction at a normally positive electrode, an oxidizable metal adapted to become oxidized at a normally negative electrode and an aqueous electrolyte containing dissolved ions of the metal and the halide. The foregoing electrical energy storage system is described in detail in copending United States patent application Ser. No. 50,054, filed June 26, 1970, entitled "Halogen Hydrates", which is owned by the same assignee as the present invention. Reference is made to the aforementioned U.S. patent application for further details of such storage devices beyond those herein disclosed in the adaptation of the storage system to a rechargeable system for use in mobile apparatuses such as vehicles and the like.

In essence, the oxidizable metal/halogen hydrate electrical energy storage system comprises an electrolyte consisting of a solution containing a dissolved metal halide and a dissolved and/or entrained halogen gas which is adapted to be reduced upon coming in contact with the normally positive electrode of a cell during the normal discharge cycle of the device. The electrolyte may further contain various additives and ingredients to impart controlled modifications and/or variations in the physical and chemical properties thereof in order to provide optimum efficiency in operation of the electrical energy storage device under different operating circumstances.

In accordance with a preferred practice of the present invention, the electrolyte is comprised of an aqueous solution which may contain from as little as about 0.1% by weight up to a saturated concentration of a metal halide consisting of metals selected from the group consisting of the Group VIII of the Periodic Chart (namely: Fe, Co, Ni, Ru, Rh, Pd, Os, Ir and Pt), metals of the Lanthanum Series (namely: Ce, Pr, Nd, Pm, Sm, Eu, Gd, Tb, Dy, Ho, Er, Tm, Yb and Lu), and Actinium Series (namely: Th, Pa, U, Np, Pu, Am, Cm, Bk and Cf), in addition to Zn, Sc, Ti, V, Cr, Mn, Cu, Ga, Y, Zr, Nb, Mo, Tc, Ag, Cd, In, Sn, Hf, Ta, W, Re, Au, Hg, Tl, Pb, Bi, Li, K, Na, Rb, Cs, Be, Mg, Ca, Sr and Ba. Those metals which react with water may be alloyed to induce stability, such as amalgams (solutions in mercury). Of the foregoing metals, zinc constitutes the most preferred metal, while iron, cobalt and nickel are preferable to the remaining enumerated metals. Of the various halogen constituents, chlorine and bromine are preferred and the chloride salts of the aforementioned preferred metals are particularly satisfactory in the practice of the present invention and constitute a preferred embodiment thereof. Particularly satisfactory results are obtained employing an aqueous electrolyte incorporating zinc chloride as the metal halide.

Although as previously indicated concentrations of the metal halide in the electrolyte as low as about 0.1% can be employed, it is preferred that the metal halide be present in concentrations of at least about 5 to about 50%, and more usually in concentrations from about 10 up to about 35% by weight. In those instances in which zinc chloride is utilized as the metal halide, a maximum conductivity of the electrolyte is obtained when a concentration of about 25% by weight of zinc chloride is present. Accordingly, when zinc chloride is the metal halide in an aqueous electrolyte, concentrations ranging from about 10 to about 35% by weight have been found particularly satisfactory.

The electrochemical reaction that occurs in the storage battery is represented by the following equations, which are representative of the situation in which the oxidizable metal is zinc, the halogen is chlorine and the hydrate is chlorine hydrate.

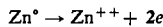
$$Zn° \rightarrow Zn^{++} + 2e$$

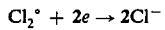
$$Cl_2° + 2e \rightarrow 2Cl^-$$

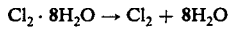
$$Cl_2 \cdot 8H_2O \rightarrow Cl_2 + 8H_2O$$

As will be noted from the foregoing equations, the progressive oxidation of the zinc to a zinc ion which becomes dissolved in the electrolyte and a corresponding reduction of elemental chlorine to a chloride ion, which also becomes dissolved in the electrolyte, would tend to effect an increase in the concentration of the metal halide in the electrolyte were it not for the fact that the progressive decomposition of the halogen hydrate results in a progressive liberation of water serving as a diluent, thereby maintaining the metal halide salt concentration in the electrolyte reasonably constant throughout the discharge cycle of the storage battery. Although the concentration of the electrolyte remains substantially constant, the total volume thereof progressively increases and appropriate provision is made in the system for accommodating such an increased electrolyte volume during operation of the storage device. As halogen hydrate decomposes, more space is available in the storage area for handling the electrolyte. A corresponding reduction in the volume of electrolyte occurs during a recharging of the electrical storage system in which a corresponding amount of dissolved metal halide is removed from the electrolyte and the resultant halogen, in combination with a portion of the water, is formed into the corresponding halogen hydrate for storage.

Referring now in detail to the drawings, and as may be best seen in FIG. 1, a typical flow arrangement of a rechargeable electrical energy storage system is illustrated in accordance with the preferred practice of the present invention. As shown, the system comprises an electrode compartment or stack, indicated at S, which is comprised of one and more usually a plurality of individual cells, each containing a normally positive electrode and a normally negative electrode. The stack is connected by means of an outlet pipe 10 and a return pipe 12 to a halogen hydrate storage compartment or receptacle, indicated at H, and through which pipes the electrolyte is continuously recirculated such as by means of a pump P. The passage of the electrolyte through the hydrate storage reservoir H during a normal discharge cycle of the storage device effects a progressive decomposition of the halogen hydrate therein whereby the liberated halogen gas is dissolved and/or entrained in the electrolyte and is conveyed by means of the return line 12 to the stack S for replenishment of the supply of elemental halogen at the normally positive electrodes therein. Since the decomposition of the halogen hydrate is an endothermic reaction, the storage reservoir H suitably may be provided with a heat exchanger, indicated at 14, for maintaining the halogen hydrate and the electrolyte therein at a temperature at which optimum performance of the storage battery is achieved during a discharge cycle.

The stack S, as shown in FIG. 1, is provided with a positive terminal 16 and a negative terminal 18, which are adapted to be electrically connected to a load, such as a drive motor M, which is selectively operable in response to a switch 20 disposed in series in the circuit. At such time that the reactive constituents within the electrical energy storage device become depleted or approach depletion, an electrical recharging of the storage system is effected by applying an electrical current of opposite polarity across the terminals 16, 18 such as by wires 22, 24, respectively, which are adapted to be electrically connected to an external power source such as a commercially generated alternative current which has been subjected to rectification for use in the recharging cycle.

During the recharging cycle, a reversal of the chemical reaction is effected whereby the oxidized metal present in the form of a dissolved ion in the electrolyte is reduced at the normally negative electrode and deposits or plates out while the halide ion becomes oxidized at the normally positive electrode, returning to the elemental state in the form of dissolved or minute gas bubbles in the electrolyte. The halogen gas thus formed is continuously removed from the cell by the electrolyte through the outlet line 10 and the electrolyte is diverted such as by a selector valve 26 through a branch conduit 28 having a cooling or refrigeration device R therein and a hydrate former device F for effecting a regeneration of the halogen hydrate. The halogen hydrate thus regenerated is returned by the circulating electrolyte to the storage reservoir H in which it is separated and retained in readiness for the next discharge cycle of the storage device.

In accordance with one embodiment of the present invention, the entire system as diagrammatically illustrated in FIG. 1 is incorporated in a vehicle or other mobile apparatus, whereby a recharging is effected by connecting the vehicle's system to an external source of electrical current. This arrangement is typified by FIG. 2. As shown, alternating current, such as purchased from a local utility, is rectified in a rectifier 30 to direct current which is adapted to be connected to the terminals of an electrode stack 32 in a vehicle 34. Within the vehicle, a hydrate storage reservoir 36, refrigeration unit 38 and hydrate former 40 are mounted, providing a self-contained unit for effecting a regeneration of the halogen hydrate and a storage thereof within the reservoir. The refrigeration unit 38 can appropriately be powered by the external source of alternating current received from the utility along with any other operating components in the hydrate former including auxiliary pumping systems. The vehicle 34 is further provided with a motor 42, which is drivingly coupled to the wheels or other propulsion device disposed in driving relationship with respect to the ground.

Figure 2:
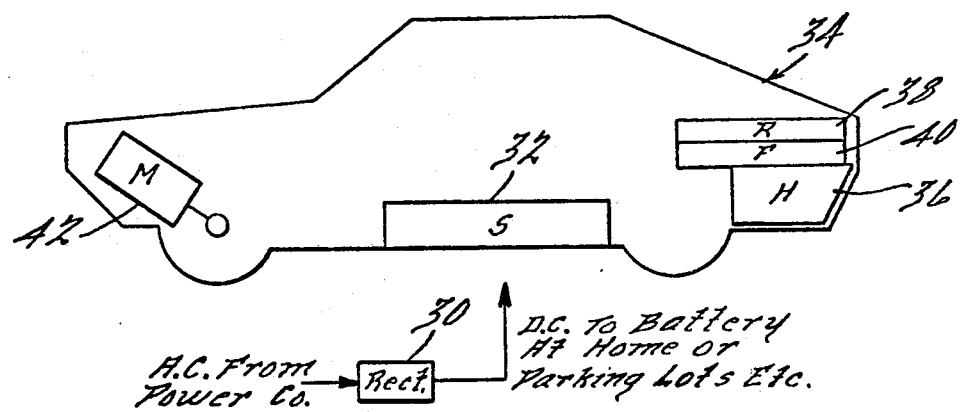
FIG. 2 is a diagrammatic view of a rechargeable electrical energy storage system as applied to a vehicle in which all of the components of the system with the exception of a rectifier are incorporated on the vehicle.

The arrangement as illustrated in FIG. 2 is typical of one in which the electrical energy storage device is of a capacity to furnish sufficient electrical power to provide for a normal day's driving of the vehicle and whereby the electrical energy storage system can be recharged during periods of nonuse, such as during the evening when the vehicle is in a garage. In accordance with this latter arrangement, further economies can be effected in purchasing the electrical power at low rates prevalent during off-peak periods.

Figure 3:
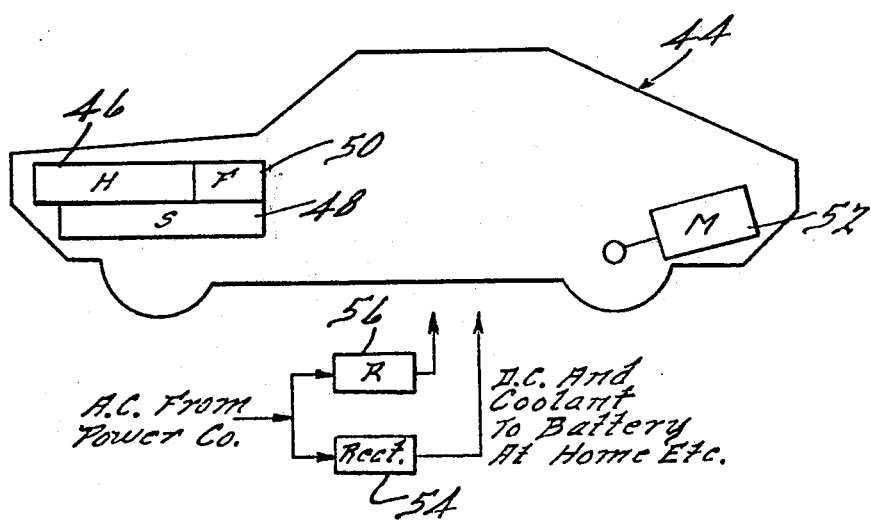
FIG. 3 is a diagrammatic view of a rechargeable electrical energy storage system as applied to a vehicle in accordance with an alternative embodiment of the present invention in which the rectifier and heat transfer means are located remotely of the vehicle.

An alternative embodiment of the electrical energy storage system as applied to a vehicle is illustrated in FIG. 3, in which a vehicle 44 is provided with a hydrate storage reservoir 46, an electrode stack 48, a hydrate former 50 and a drive motor 52 electrically connected to the storage system and drivingly coupled to the wheels of the vehicle. Disposed remotely of the system on the vehicle is a rectifier 54 adapted to rectify purchased alternating current generated remotely or purchased from a utility and a cooling or refrigeration unit 56, which is electrically powered by the same source of alternating current. The output of the rectifier and the refrigeration unit are adapted to be connected to the system on the vehicle during a recharging cycle during periods of nonuse of the vehicle as in the case of the vehicle 34 previously described. In accordance with this arrangement, a weight reduction of the system in the vehicle is effected by the removal of the refrigeration unit and the cost of operation of the refrigeration unit can be prorated over a plurality of vehicle systems which are electrically recharged thereby.

Figure 4:
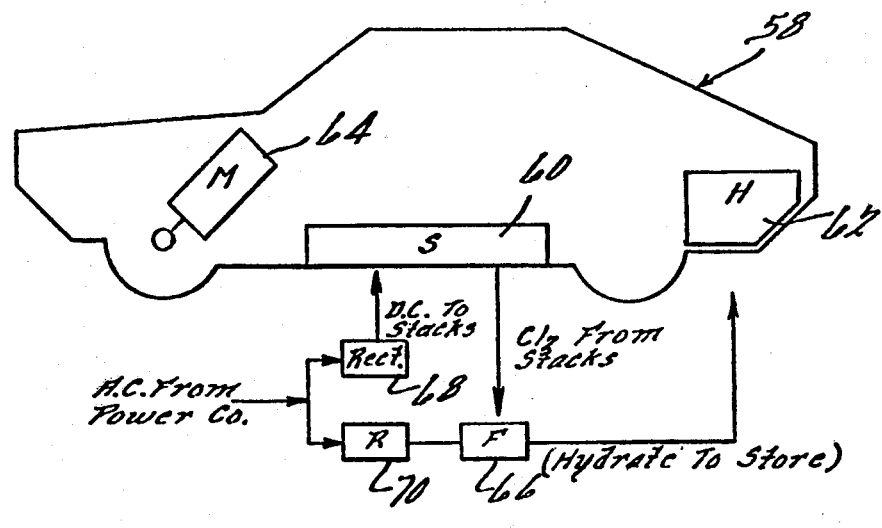
FIG. 4 is a diagrammatic view of a rechargeable electrical energy storage system in accordance with another satisfactory embodiment of the present invention in which the rectifier, heat transfer means and hydrate former are disposed in a system remote from the vehicle and connectable thereto during a charging cycle.

Still another alternative satisfactory embodiment of an electrical energy storage system in a vehicle is shown in FIG. 4. As shown, a vehicle 58 is provided with a self-contained electrode stack 60 and hydrate storage area 62 which serve to supply electrical energy to a drive motor 64 for propelling the vehicle. In this system, a still further reduction in weight or a corresponding increase in the size of the stacks and hydrate storage can be effected by the removal of a hydrate former 66 along with a rectifier 68 and refrigeration unit 70 to a position exteriorly of the vehicle in which they are used only during periods of recharging of that vehicle or other similarly equipped vehicles.

The arrangements as illustrated in FIGS. 2, 3 and 4 can similarly be adapted to stationary electrical energy storage systems in which sections of the recharging system are mobile and can be transported for connection to the storage system for effecting a recharging thereof as may be required from time to time.

Figure 5:
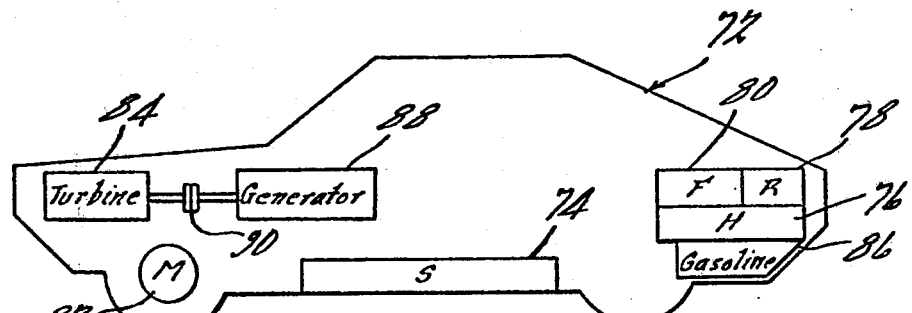
FIG. 5 is a diagrammatic view of a rechargeable electrical energy storage system as applied to a vehicle, further including a turbine adapted to be coupled to the means for propelling the vehicle or to a generator thereon to supplement the energy delivered by the storage system.

A still further embodiment which is somewhat similar to that shown in FIG. 2 is illustrated by a vehicle 72 shown in FIG. 5. The vehicle 72, in addition to incorporating an electrical energy storage system comprising an electrode stack 74, a halogen hydrate storage reservoir 76, a refrigeration unit 78, a hydrate former 80 and a drive motor 82 for propelling the vehicle, additionally includes a fossil-fueled internal combustion engine, such as a turbine 84, which is fueled from a tank 86. The turbine 84 is adapted to be drivingly connected to an electrical generator 88 such as by means of a coupling 90. The turbine 84 is adapted to run at a substantially constant speed corresponding to optimum performance conditions therefor and may be electrically or mechanically coupled to the propulsion means on the vehicle for applying a sufficient driving force to maintain a moderate constant speed of the vehicle over normal terrain. Additional power to effect an acceleration of the vehicle and to facilitate the surmounting of grades can be supplied by the electrical energy storage device thereon, as well as supplying additional power for high speed performance of the vehicle. The foregoing power arrangement is particularly satisfactory for long-range cross-country driving which substantially increases the range of operation of the vehicle and also reduces the number of recharging cycles of the electrical storage system thereon.

The driving relationship of the generator 88 by the coupling 90 in accordance with the foregoing arrangement additionally serves to effect a regeneration or recharging of the electrical storage system on the vehicle during constant low speed driving of the vehicle in which the turbine 84 is of adequate capacity to propel the vehicle under such conditions, as well as to provide excess power for generating the recharging current. In this latter arrangement, brief accelerations of the vehicle, climbing of grades and/or increases in speed are effected by a supplemental supply of power from the storage device to the propulsion motor 82 of the vehicle.

In each of the foregoing arrangements, the hydrate formers F may comprise any one of a variety of satisfactory devices which, in combination with a cooling unit, are effective upon forming a mixture of the regenerated halogen, such as chlorine and water, to produce the corresponding halogen hydrate. The halogen hydrate formed is separated from the aqueous solution or aqueous electrolyte and returned to the reservoir H.

While it will be apparent that the invention herein disclosed is well calculated to achieve the benefits and advantages as hereinabove set forth, it will be appreciated that the invention is susceptible to modification, variation and change without departing from the spirit thereof.

What is claimed is:

1. In an electrically rechargeable electric energy storage system having (a) an electrode compartment means having an inlet means and an outlet means, said electrode compartment means having at least one cell having a positive halogen electrode and a negative metal electrode, wherein during the charge metal ions from an aqueous metal halide electrolyte are deposited onto the metal electrode and halogen is generated at the halogen electrode from the halide ions in the electrolyte, and during discharge the metal and halogen are converted back to the respective ions; (b) a storage compartment means having an inlet means and an outlet means and adapted to contain a halogen hydrate formed during the charging of the system; (c) a conduit means connecting the electrode compartment means and the storage compartment means, whereby electrolyte circulates between the electrode compartment means and the storage compartment means, the improvement which comprises valve controlled bypass means for said conduit means, said by-pass means having heat transfer means and halogen hydrate formation means serially included therein so as to cool the electrolyte which is circulating between the electrode compartment means and the storage compartment means through said conduit means, the halogen hydrate formation means being adapted to form halogen hydrate from the halogen and cool aqueous metal halide electrolyte solution during charging, said by-pass means being adapted to be disconnected from said conduit means after charging.

2. The storage system as defined in claim 1, wherein said hydrate formation means is adapted to be connected to said bypass during charging thereof and disconnected therefrom after charging.

* * * * *